(No Model.) 6 Sheets—Sheet 1.
A. GIBB.
MACHINE FOR MAKING BOX PLAITED PAPER FOR CARPET LININGS, &c.
No. 476,791. Patented June 14, 1892.
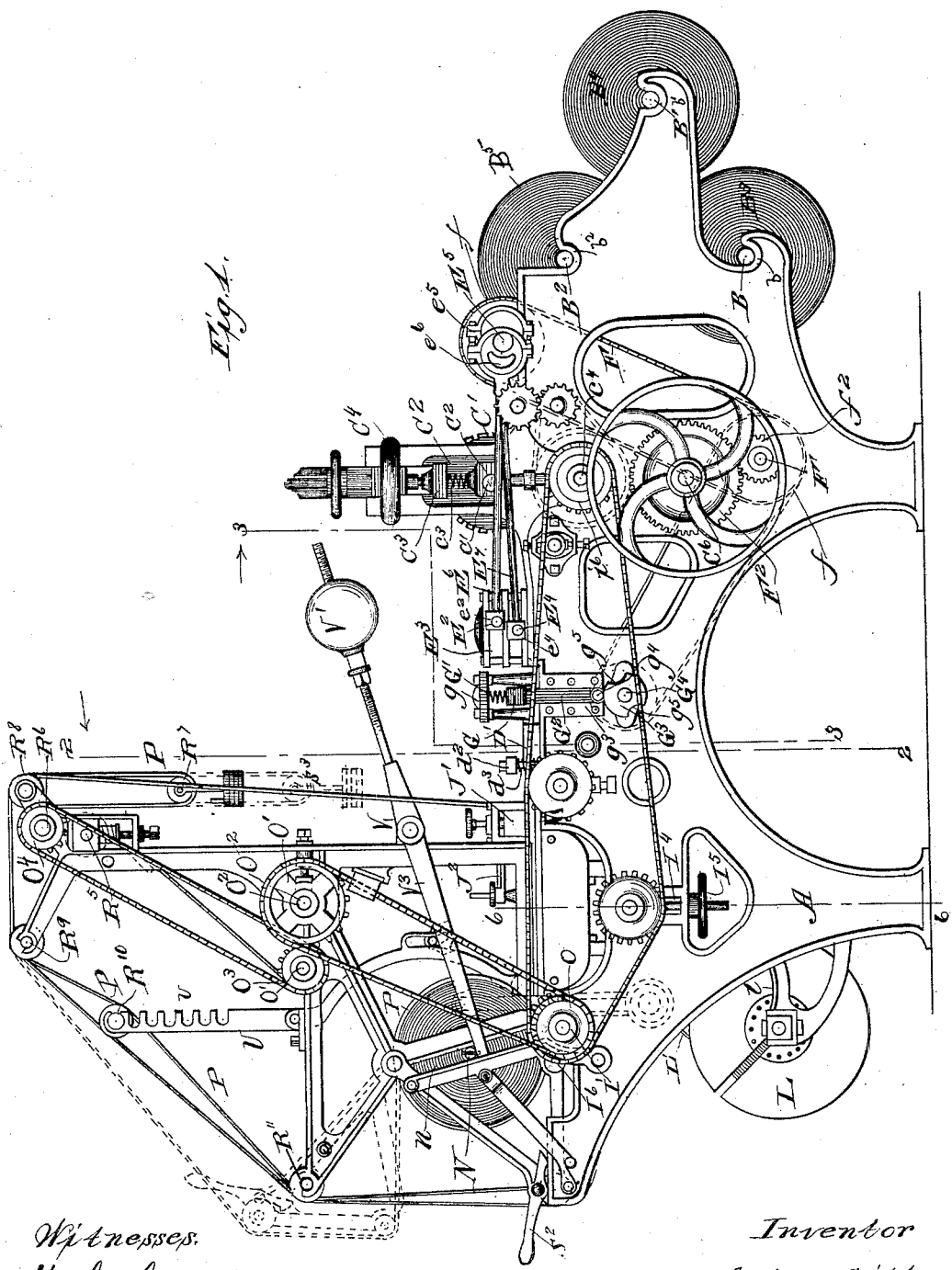
Witnesses.
W. C. Coalies
A. M. Best.
Inventor
Austin Gibb.
By Goldwin & Thacher
Attys.

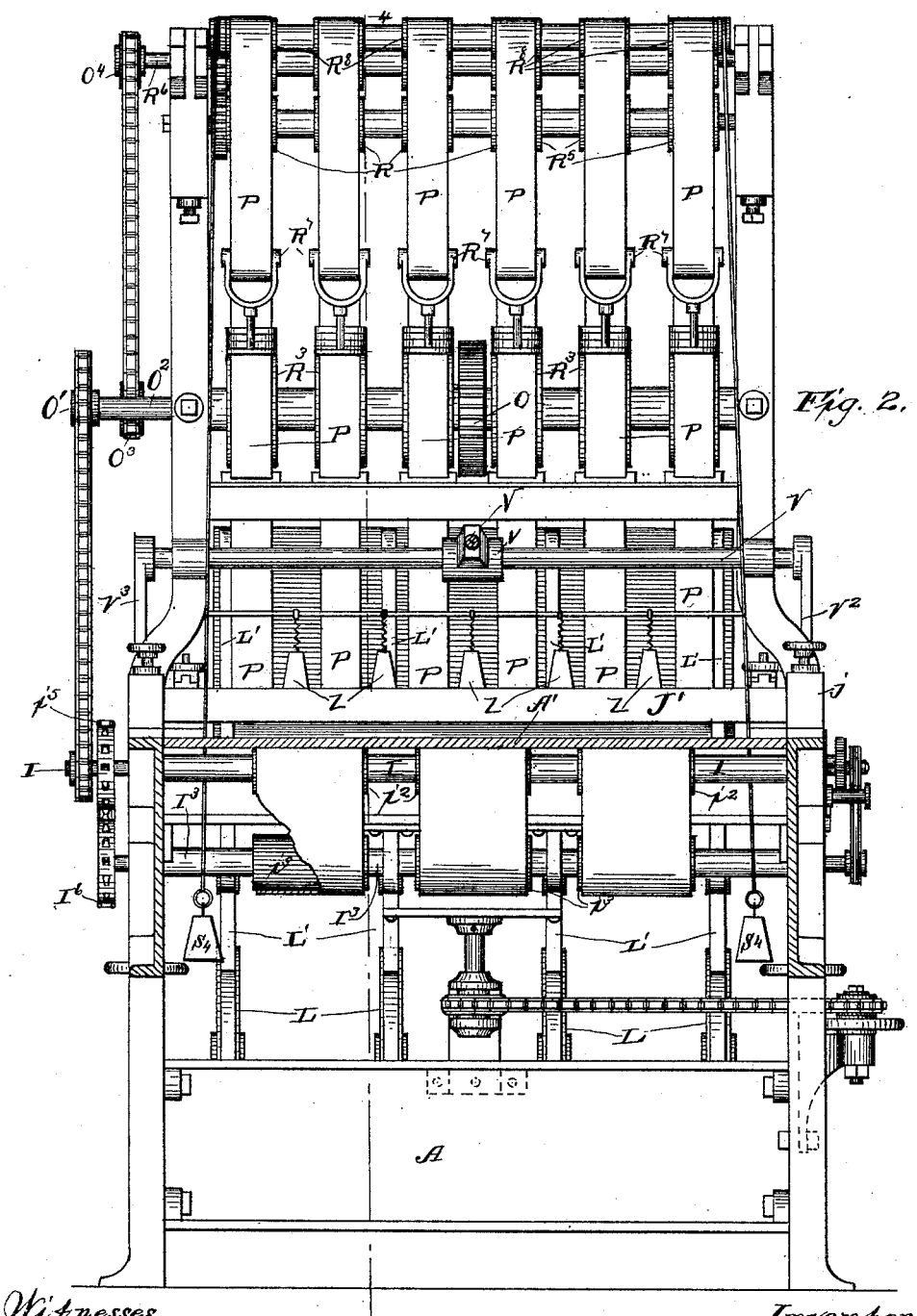

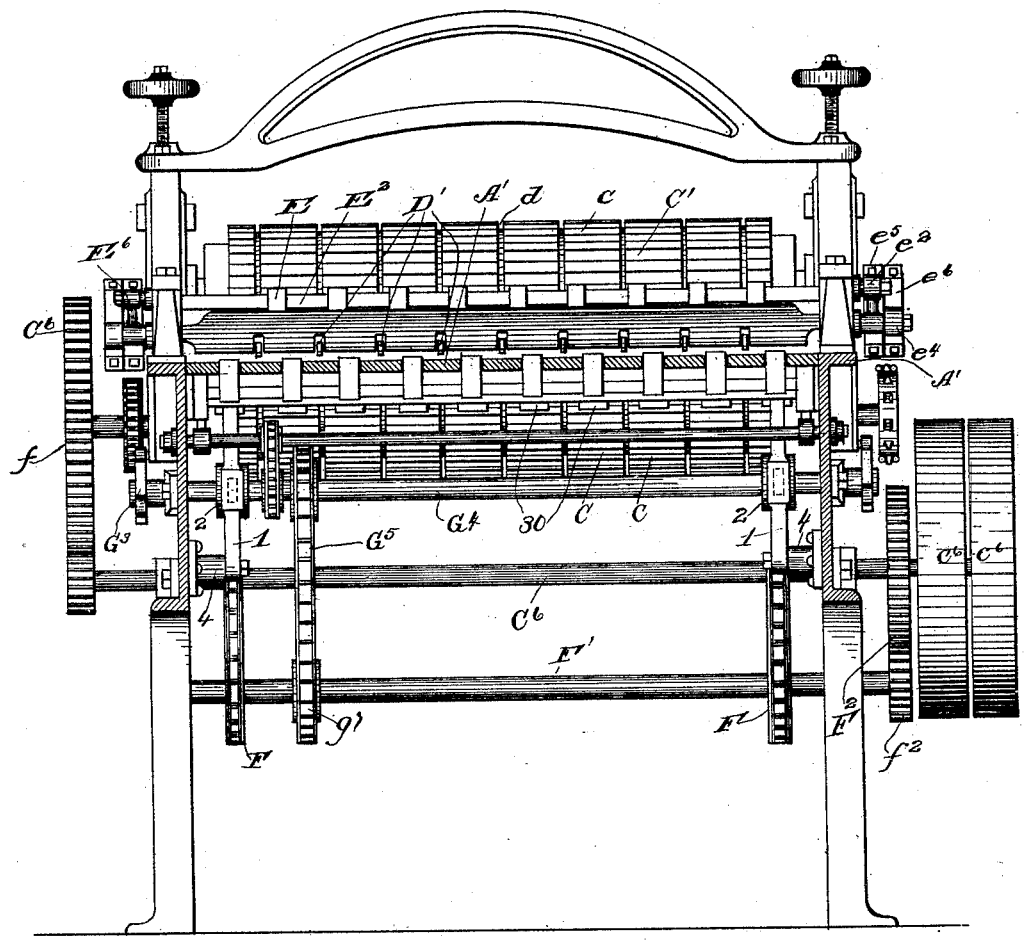

(No Model.) 6 Sheets—Sheet 4.
A. GIBB.
MACHINE FOR MAKING BOX PLAITED PAPER FOR CARPET LININGS, &c.
No. 476,791. Patented June 14, 1892.
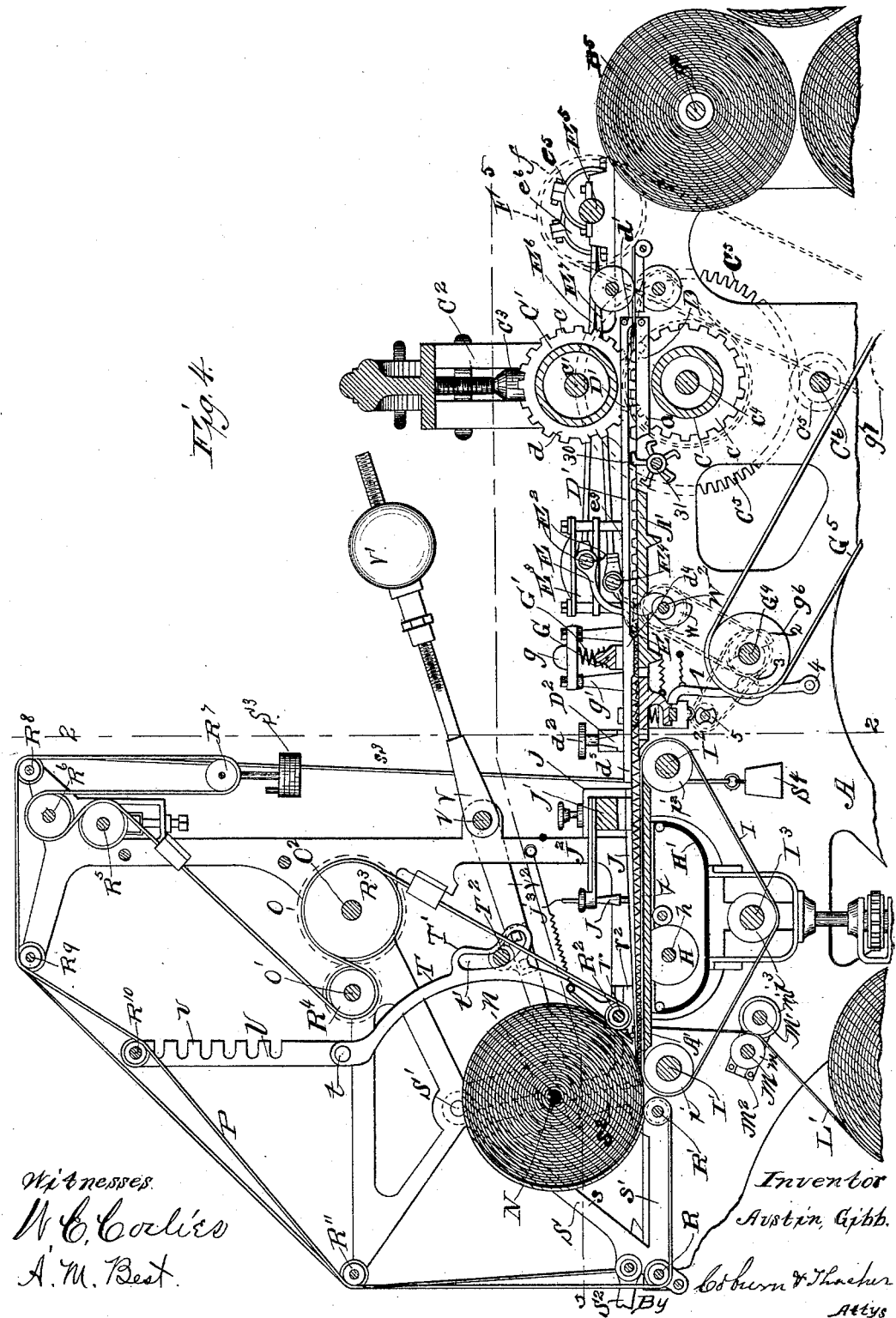
Witnesses
W. C. Coolies
A. M. Best.
Inventor
Austin Gibb.
By Coburn & Thacher
Attys (No Model.) 6 Sheets—Sheet 5.
A. GIBB.
MACHINE FOR MAKING BOX PLAITED PAPER FOR CARPET LININGS, &c.
No. 476,791. Patented June 14, 1892.
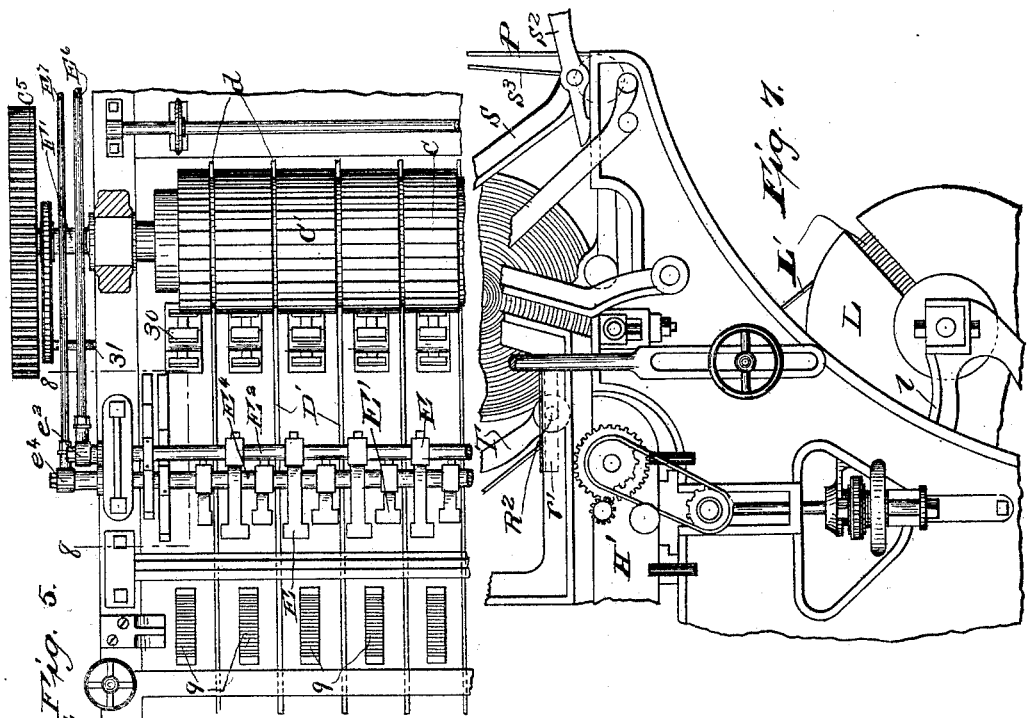
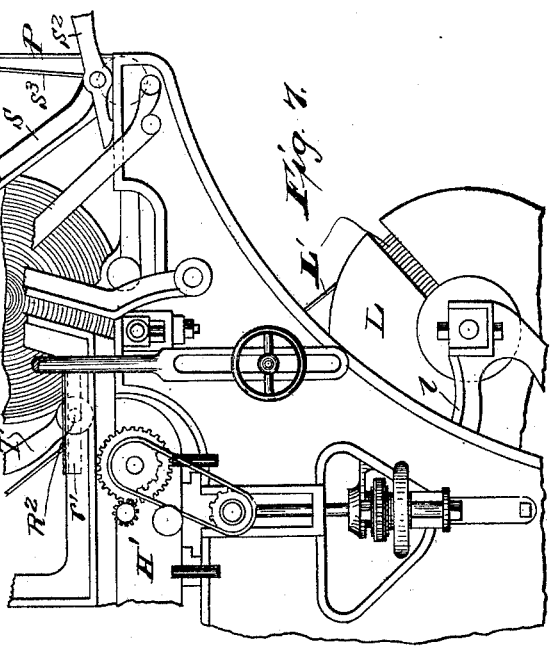
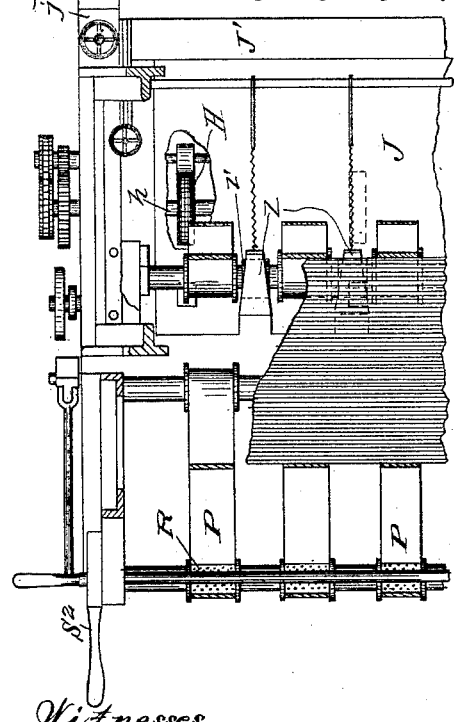
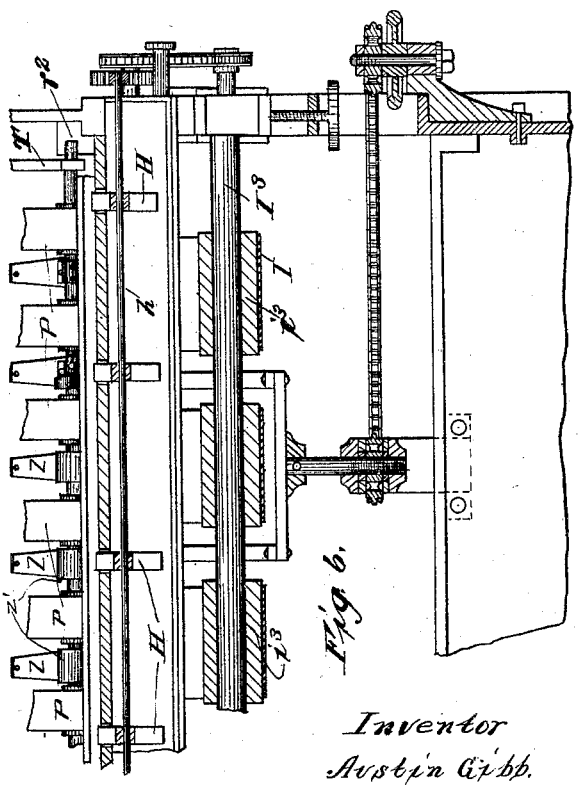
Witnesses.
W. C. Coilier
A. M. Best
Inventor
Austin Gibb.
By Coburn Thacher
Attys (No Model.) 6 Sheets—Sheet 6.
A. GIBB.
MACHINE FOR MAKING BOX PLAITED PAPER FOR CARPET LININGS, &c.
No. 476,791. Patented June 14, 1892.
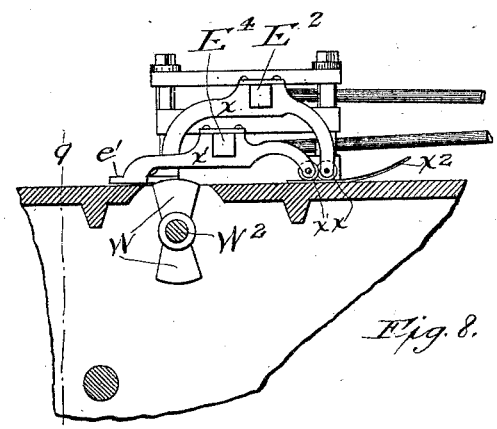
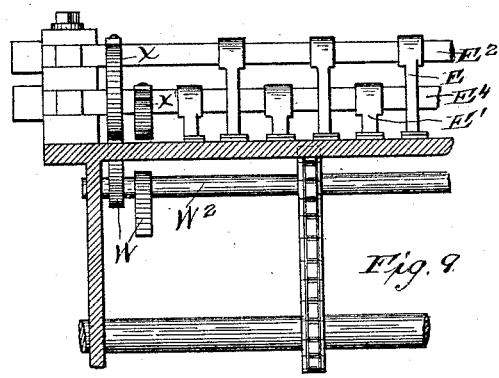
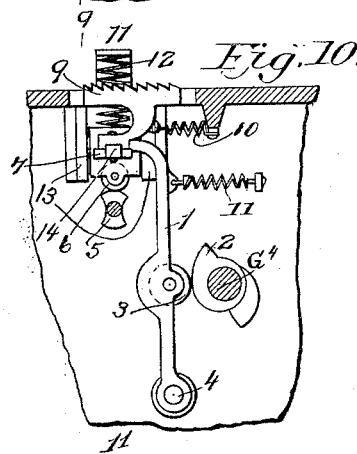
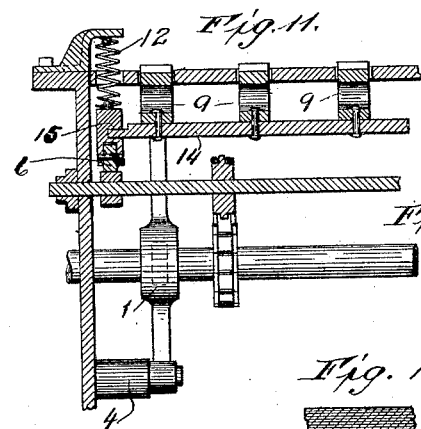
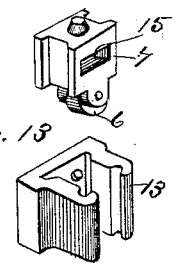
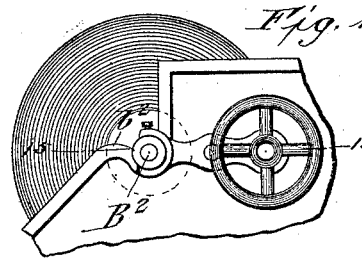
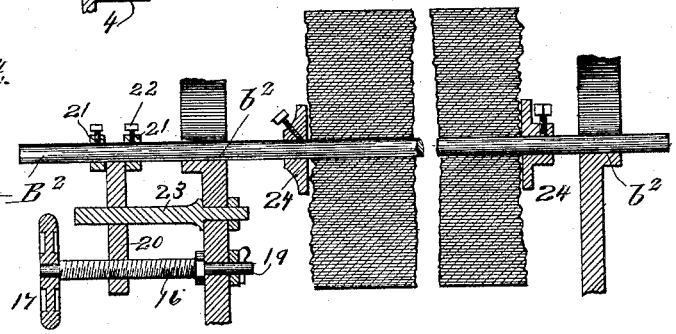
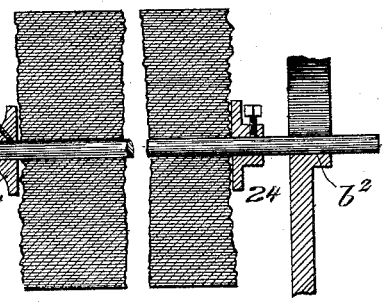
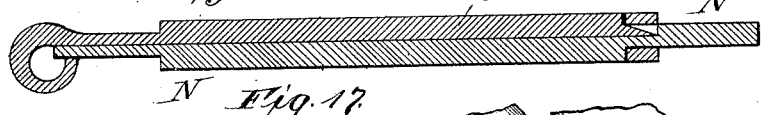
Witnesses.
W. C. Coelies
A. M. Best
Inventor:
Austin Gibb.
By Coburn & Thacher
Attys

UNITED STATES PATENT OFFICE.

AUSTIN GIBB, OF MILWAUKEE, WISCONSIN, ASSIGNOR TO THE FOLDED PAPER CARPET LINING COMPANY, OF ILLINOIS.

MACHINE FOR MAKING BOX-PLAITED PAPER FOR CARPET-LININGS, &c.

SPECIFICATION forming part of Letters Patent No. 476,791, dated June 14, 1892.

Application filed April 17, 1891. Serial No. 389,295. (No model.)

*To all whom it may concern:*

Be it known that I, AUSTIN GIBB, a subject of the Queen of Great Britain, residing at Milwaukee, in the county of Milwaukee and State of Wisconsin, have invented a certain new and useful Improvement in Machines for Making Box-Plaited Paper for Carpet-Linings, &c., which is fully set forth in the following specification, reference being had to the accompanying drawings, in which—

Figure 1 is a side elevation of a paper-crimping machine embodying my invention. Fig. 2 is a detail cross-section of the same looking in the direction of the arrow, taken on the line 2 2 of Fig. 1. Fig. 3 is a similar detail cross-section taken on the broken line 3 3 of Fig. 1, looking in the direction of the arrow. Fig. 4 is a longitudinal vertical section taken on the line 4 4 of Fig. 2, looking in the direction of the arrow. Fig. 5 is a detail plan section of one-half of the machine, taken on the broken line 5 5 of Fig. 4. Fig. 6 is a detail cross-section through the paste-box, taken on the line 6 6 of Fig. 1. Fig. 7 is a detail elevation at the discharge end of the machine opposite to the one shown in Fig. 1, showing the sprocket chain and wheels for operating the paste-rolls. Fig. 8 is a detail sectional view of the automatic device for operating the tuckers. Fig. 9 is a detail sectional view of the same, taken on the line 9 9 of Fig. 8. Fig. 10 is a detail sectional view of the automatic feed-bar and its operating-cams. Fig. 11 is a detail section of the same, taken on the line 11 11 of Fig. 10. Fig. 12 is a perspective view of the shifting box which holds the feed-bar, as shown in Fig. 10. Fig. 13 is a perspective view of the bracket for holding the box above stated in Fig. 12. Fig. 14 is a side elevation of an automatic device for regulating and straightening the edge of the paper when going into the machine. Fig. 15 is a detail plan section of the same, taken on the line 15 15 of Fig. 14. Fig. 16 is a detail section of the spindle upon which the paper is wound. Fig. 17 is a perspective view of a portion of the finished crimped paper as it comes from the machine.

Like letters and numerals refer to like parts in all the figures of the drawings.

My invention relates to machines for making folded or box-plaited paper for carpet-linings and other purposes, for a full description of which article reference is made to a patent granted me March 20, 1888, No. 379,571, in which I have fully described the same.

My present invention has for its object to produce a machine by means of which the said article may be produced in a rapid, cheap, and effectual manner, the machine being automatic in its action and dispensing with the employment of manual labor, except such as is necessary to supervise the operation of the machine.

To these ends my invention consists in certain novel features, which I will now proceed to describe, and will then particularly point out in the claims.

In the drawings I have shown an organized machine in which my invention is practically carried out in one form. In this construction, A represents the main frame of the machine, which is suitably constructed to receive and support the various mechanisms of which the machine as a whole is composed. At one end of the frame A there is provided a series of bearings $b$ $b'$ $b^2$ to receive the spindles B B' B² upon which the continuous webs or rolls of paper $B^3$ $B^4$ $B^5$ are mounted. In the present instance I have shown three of these rolls; but it is obvious that any desired number, greater or smaller, may be employed, if desired. The bearings $b$ $b'$ $b^2$ are open at the top, as shown, so that the rollers may be readily placed in position and removed, as desired, the said rollers being free to rotate in their bearings as the paper is drawn from the rolls by the action of the crimping-rollers. These latter are shown at C and C', and consist of a pair of transverse rollers, the one C' arranged above the other C, the two being provided with intermeshing ribs and grooves or gear-teeth $c$, rectangular in cross-section and meshing with each other. These ribs and grooves have their surfaces arranged at angles to each other and operate as dies in making definite creasing-lines in the paper to be stamped, so that the paper can be readily operated on afterward by the tuckers, as hereinafter described. The shaft $c'$ of the upper roller is mounted in boxes $c^2$, mounted to slide vertically in suitable upright ways $C^2$. Above each box is arranged a coiled spring $c^3$, arranged to bear upon said box, surmounted by a thrust-block $C^3$, also sliding on the ways $C^2$ and adjustable by means of an adjustable screw $C^4$, which serves to regulate the action of the spring. The upper roller $C'$ is driven by the lower roller C, and this latter is mounted on a shaft $c^4$, provided with a gear-wheel $C^5$, which meshes with a pinion $c^5$ (shown in dotted lines in Fig. 4 of the drawings) on the main shaft $C^6$ of the machine. This latter shaft is provided with pulleys $c^6$, by means of which it may be driven from any suitable source of power.

The bed $A'$ of the machine, along which the paper travels, is cut away at $a$ to allow the lower crimping-roller to project upward. In order to strip the paper from the crimping-rollers, I employ strippers composed of two sets of bars, the lower set D arranged flush with the surface of the bed $A'$ and extending across the opening $a$ in said bed, as shown. The crimping-roller C is provided with a series of deep circumferential grooves $d$ to receive the stripper-bars, the said grooves being of sufficient depth to allow the intermeshing ribs and grooves $c$ when in operation to project above the stripper-bars clear of the same. The upper series of stripper-bars (shown at $D'$) are preferably of considerably greater length than the under ones, and, having their front ends pivoted at $d'$, extend through grooves $d$ in the upper crimping-roller $C'$ to a support $D^2$, to which they are attached, the said support being vertically adjustable by means of adjusting-screws $d^2$ and supported by springs $d^3$. These upper stripper-bars extend over the bed $A'$ through and beyond the tucking and compressing mechanism to the pasting mechanism. These upper stripper-bars $D'$ are preferably shaped so that they have a very slight inclination toward the bed, beginning at the crimping-rollers and extending almost to the plunger or presser-bar, but being arranged at such a distance above the bed of the machine that they do not compress the crimped paper during this portion of its course. Immediately in advance of the plunger each stripper-bar is provided with a rather sharp downward incline $d^4$, and beyond this point they are for some distance quite close to the bed, against which they compress the tucked paper. At their rear extremities they are beveled upward on their under sides, as shown at $d^5$, to allow the folds of the paper free play before they reach the pasting mechanism.

Next to the crimping-rollers is arranged the tucking mechanism. This consists of two sets of vibrating arms E and $E'$, reciprocating lengthwise of the bed $A'$, above the same. Each of said arms is provided with a tucking-finger $e$ of considerable transverse breadth, inclined to the proper angle to the bed for its purpose. A second finger $e'$, to extend horizontally over the top of the paper, is also provided on the said tucking-arm. The arms E are attached to a transverse shaft $E^2$, mounted in boxes $e^2$, sliding in suitable ways $E^3$ on each side of the bed $A'$, and the arms $E'$ are similarly attached to a corresponding shaft $E^4$, mounted in boxes $e^4$, reciprocating in ways $e^3$ below the ways $E^3$. In order to operate the tucker-arms, I employ a shaft $E^5$, provided with eccentrics $e^5$ at each end thereof, connected by eccentric-rods or pitmen $E^6$ to the projecting ends of the shaft $E^2$, on which the arms E are mounted. Similar eccentrics $e^6$ of equal but opposite eccentricity are similarly connected by means of eccentric-rods or pitmen $E^7$ to the shaft $E^4$, on which the arms $E'$ are mounted. It will be seen that by reason of this construction the arms E and $E'$ reciprocate simultaneously in opposite directions.

In order to cause the tucker-arms to rest upon the paper during their forward movement and to raise and clear the same during their return, I employ the following devices: W $W'$ are cams similar in construction and usually cast in one piece. These cams are mounted on the shaft $W^2$, journaled in the frame of the machine and operated by a sprocket wheel and chain from the hammer-shaft $G^4$. X $X'$ are arms mounted on the shafts of the tucker-arm E and $E'$, respectively. During the forward movement of the tuckers to the point where they engage with the paper they are held to their work by the action of the cams and the springs $x^2$, as hereinafter stated. Immediately after the tucker-arm has performed its office and at the time of the withdrawal one of the cams strikes one of the arms X, thereby causing the shaft $E^2$ of the tucker-arm E to rock, and thus causing the tuckers to rise clear of the paper while being retracted. The tucker-arm $E'$ is in like manner alternately operated upon by devices similar to those acting upon arm E.

In order to hold the tucker-arms down to their work during their forward motion, I employ the following devices: $x$ $x'$ are rollers pivoted to the ends of the arms X $X'$, as shown in Fig. 8. $x^2$ is a flat spring curving upward at its outer and free end and secured at its inner end to the table. The rollers $x$ $x'$ rest on the inner end of this spring. Now when the cams W $W'$ strike their respective arm, rocking the shafts of the tuckers, each arm as the tucker is moving rearward will ride upward on the spring $x^2$ until the limit of that movement is reached, and when the forward movement commences the spring $x^2$ will tend to throw the tucker-arms downward, causing them to press with some force on the paper. The shaft $E^5$ is driven by means of a sprocket-chain F, passing over a sprocket-wheel $f$ on said shaft and also over a sprocket-wheel $f'$ on a shaft $F'$. This latter shaft is provided with a pinion $f^2$, which meshes with a gear-wheel $F^2$ on the main shaft $C^6$.

Immediately adjacent to the tuckers and in the rear thereof is arranged the compressing mechanism. This consists of a compressor or plunger G, extending across the bed $A'$ from side to side thereof. This compressor moves vertically with relation to the bed and is normally depressed by means of coiled springs G', bearing against a cross-head $g$, mounted on supports $g'$ on each side of the bed and against the compressor, which latter is provided with sockets to receive the said springs. From the ends of the compressor G arms $G^2$ extend downward, mounted in suitable ways $g^3$ and provided with anti-friction rollers $g^4$ to bear upon the cam-wheels $G^3$, which serve to operate the compressor upward. These cams are so constructed as to hold the compressor steadily in its raised position for a sufficient length of time and then allow it to drop suddenly and forcibly under the action of its own weight, and the force of springs G' returning it quickly to its raised position and holding it there until the next stroke. In the present instance I have shown each cam $G^3$ as provided with two diametrically-opposite depressions $g^5$ of slight length compared with the total perimeter of the cam, so that two quick strokes of the compressor are produced by each complete revolution of the said cams. The cams $G^3$ are mounted on a shaft $G^4$, provided with a sprocket-wheel $g^6$, over which and over a similar wheel $g^7$ on the shaft F' a sprocket-chain $G^5$ passes, by which means the compressing mechanism is driven. The compressor G is provided with slots, through which the upper stripper-bars D' extend.

For the purpose of moving the paper forward to the paste-rolls after it has been acted on by the compressor, I employ the following devices: 1 is a lever pivoted to the frame of the machine at 4. At or near the center of this lever 1 is a friction-roller 3, so arranged on the lever as to be operated upon by the cam 2, which is mounted on the hammer-shaft $G^4$. The upper end of the lever 1 is free, and it rests against the feeding device 9. The feeding device 9 is the ordinary feed mechanism, having an arm resting on a bar 14, with a plate secured to said arm, which is serrated for the purpose of engaging with the paper and propelling it forward. 5 is a double cam having diametrically-opposite depressions operated by a sprocket chain and wheel, which is operated by another sprocket-wheel on the hammer-shaft $G^4$. 7 is a box for holding the feed-bar 14, upon which the feed mechanisms rest. This box has a slot 15 in the center, in which this feed-bar 14 rests and through which it has its horizontal motion, as hereinafter described. At the lower end of this box is attached a roller 6, which is operated upon by the cam 5 for the purpose of reciprocating the feed mechanism vertically. The box 7 slides in bracket 13, as shown in Fig. 13. The bracket 13 is secured to the frame of the machine by any suitable means. Cam 5 revolves rapidly on its shaft. When the cam 5 in its revolution has operated on the roller 6 so as to throw the feed mechanism upward to the limit of its vertical movement, as shown in Fig. 10, the cam 2 is so arranged as to strike the pulley 3 on the lever, pressing the lever forward and pushing the feed mechanism ahead, with the paper attached, immediately after which the cam 5 in its revolution, on account of the depression in its surface, allows the roller 6, with the box 7, to fall away from the paper, when the spring 10 will retract the feed mechanisms, the slot 15 in the box 7 allowing the feed mechanism to slide backward at the same time the lever is pulled back by the action of the coiled spring 11. Both of these coiled springs are secured at their rear ends to the frame of the machine. 12 is a coiled wire spring so secured and so operating as to force the feed or box 7 down immediately after the feed has operated on the paper to push it forward. There are a sufficient number of these feed mechanisms arranged in the machine to feed the paper forward with uniformity. All are alike in their construction and operation.

Next to the feed mechanism is arranged the pasting mechanism. A series of paste-wheels H, mounted on shafts $h$, project upward through the bed A'. In the present instance I have shown four of these wheels; but it is obvious that the number may be varied, as desired. These wheels run in a paste trough or reservoir H', arranged under the bed A'. Between the paste-wheels H are arranged carrier-belts I, one between each pair of wheels. These belts run in suitable grooves or depressions in the bed A', so as to project but slightly above the surface of the same, and are actuated by means of a shaft I', provided with a roller $i'$, over which the belts I pass. The said belts also pass over a roller $i^2$ on a shaft $I^2$ at the front of the pasting mechanism and over a roller $i^3$ on a shaft $I^3$ below the said mechanism, this latter shaft being adjustable, as shown, to tighten the belts. This adjustment is effected by mounting the boxes of the said shaft in suitable ways $I^4$ and providing an adjusting-screw $I^5$ to move the same vertically. The shaft I' is actuated by means of a sprocket-chain $I^6$, passing over a sprocket-wheel $i^5$ on said shaft and over a similar wheel $i^6$ on the shaft $c^4$.

Above that portion of the bed upon which the belts I travel is arranged a pressure-plate J, which is connected at its forward end to a cross-bar J', which is pivoted at its ends in boxes $j$. These boxes are supported by springs $j'$ and are adjusted by means of adjusting-screws $j^2$. To the cross-bar J' are secured arms $J^2$, one at each end, which arms are provided at their free ends with adjusting-screws $j^3$, by means of which the cross-bar may be turned upon its pivots, so as to adjust the pressure of the plate J upon the fabric which passes beneath it. The boxes $j$ may be adjusted vertically in an obvious manner to regulate the height of the forward end of the plate J. It will be observed that this plate presses upon the paper with an increasing pressure toward the rear and holds the fabric firmly in contact with the paste-wheels, so as to insure the application of the paste to the same. This pressure is, moreover, a yielding pressure, which will prevent clogging or binding during the passage of the fabric through the pasting mechanism.

At the rear of the machine, beneath the pasting mechanism, is arranged a series of bearings $l$, in which are mounted the rollers L, which carry the rolls L' of binding-strips. These rollers are independent and free to revolve in their bearings as the strips are drawn off from them. In the present instance I have shown four of these binding-strip rollers; but it is obvious that the number may be varied, as desired. Each strip is carried up through a tension device, which consists of two transverse shafts M M', mounted in boxes $M^2$. Upon the shafts M M' are mounted friction-rolls $m\ m'$, the upper one of which, with the shaft on which it is mounted, is adjustable by any suitable means and by which the distance between the rolls may be varied. The binding-strips pass from the rollers L up between the rolls $m\ m'$ and under the finished paper.

Above the shaft I' is arranged the roller N, upon which the finished fabric is wound. The spindle N is composed of the spindle proper N, which is grooved lengthwise, so as to allow the key $n^2$ to be inserted, as shown in Fig. 16, and which is secured in the groove in any suitable manner. When the paper is to be wound onto the spindle, the ends of the binding-strips on which the paper is pasted are inserted in the groove and secured therein by the key $n^2$, so that the finished paper can be readily wound on the spindle. It revolves freely between the guides $n\ n$, which support it laterally and at the same time permit it a free vertical movement, one of said guides forming a side of the pivoted triangle, hereinafter described. The finished fabric is wound onto the roller or spindle N by a series of tapes P, which, with the devices for actuating the same, I will now describe.

On the shaft I', at the outer end, is a sprocket-wheel O, connected by a sprocket-wheel chain to a second sprocket-wheel O'. On the shaft $O^2$, on which the sprocket-wheel O' is mounted, is secured a gear $o$, as shown in Figs. 2 and 4, which is actuated by the shaft $O^2$. This gear meshes with and actuates a pinion on the shaft $o'$, on which the sprocket-wheel $O^3$ is mounted. This sprocket-wheel $O^3$ is connected by a sprocket-chain with the sprocket-wheel $O^4$, as shown in Fig. 1. These are the actuating devices of the friction driving-rollers $R^3$, $R^4$, $R^5$, and $R^6$, which draw the tapes. These tapes are drawn by the following-described rollers in the manner and direction described.

R represents a set of rollers at the lower corner of the pivoted triangle, hereinafter described. From R the tapes pass to another set of rollers R'. The rollers R' are at the lower opposite angle of said triangle and as close to the uprights $n\ n$ as they can be operated. The tapes pass from rollers R' over the spindle N and under another set of rollers $R^2$. The finished paper is fed toward the spindle N, which receives it on its under side. After the paper has passed under the spindle N it is turned onto the spindle by the action of the tapes passing over the upper side of the spindle, thus causing the paper to be wound on the spindle until a roll of paper of sufficient size is formed, when it is taken out of the machine in the manner hereinafter described. The rollers $R^2$ are mounted on a shaft $r$, adjustable by suitable means in boxes $r^2$, the adjustment being effected by devices hereinafter described. The tapes P are passed from the rollers $R^2$ to the rollers $R^3$, mounted on the shaft $O^2$ on which the sprocket-wheel O' is mounted. The tapes then pass from the rollers $R^3$ around rollers $R^4$, mounted on a shaft $o'$, which actuates the sprocket-wheel $O^3$. From the rollers $R^4$ the tapes pass around rollers $R^5$, which have their bearings in adjustable boxes secured in the upright frame, as shown in Fig. 1. From the rollers $R^5$ the tapes pass to the rollers $R^6$, and from thence to the movable pulley $R^7$, and from the movable pulley $R^7$ these tapes pass to the idler-rollers $R^8$, $R^9$, $R^{10}$, and $R^{11}$, respectively, and from thence to the rollers R first described, thus completing the circuit, the tapes being endless. I do not restrict myself to the exact number of friction driving-rollers shown. There may be more or less; but there should be sufficient to cause friction enough to wind the paper upon the spindle N, the object of these tapes, with the actuating mechanisms, being to wind up the completed fabric onto the spindle.

Whenever a roll of paper of sufficient size is formed for the purpose of allowing such completed roll to be readily removed from the machine, I construct part of the frame holding the pulleys in the following manner: S is a triangle of three sides $s$, $s'$, and $s^2$, as shown in Fig. 4 of the drawings. This triangle is pivoted at S' to the frame of the machine. At the lower corners of it are the rollers R and R', as before described. Whenever a roll of paper is formed of sufficient size and it is desired to remove it from the machine, the working of the machine is stopped and the triangle S, holding the rollers R R', is swung upon the pivot S' and the paper-roll is removed, this triangle assuming the position shown in dotted lines in Fig. 1. For the purpose of keeping the tapes tight over the roll of paper lining while it is being rolled up and also for the purpose of keeping them in position when the triangle S is swung upon its pivot a weight $S^3$ is attached by suitable means to the pulleys $R^7$. This weight may be varied as the paper-roll requires more or less friction. When the triangle is drawn up, this weight will lower the pulleys $R^7$, with the tapes attached, the same distance as the triangle is thrown up for the purpose aforesaid. The triangle S is locked in the machine by spring-catches $S^2$ in the usual manner of such devices. The rollers $R^{10}$ act as a tightener of the tapes, the tapes passing under this set of rollers, as shown in Fig. 4. These rollers $R^{10}$ are adjustable in the frame of the machine, as shown in Fig. 4, by means of the post U in the frame of the machine, in which are notches $u$, the shafts of the rollers $R^{10}$ being secured in any one of these notches either to tighten or loosen the tapes, as may be desired. $S^4$ is a weight suspended by a rope $s^3$, which extends over the pulleys $R^8 R^9 R^{11}$ and is fastened to the lower corner of the triangle S at or near the rollers R. The object of this weight $S^4$ is to hold the triangle S in position when it is thrown up for the purpose of removing the roll of paper, as shown in Fig. 1.

A difficulty has been experienced in keeping the spindle N in a horizontal plane, there being a tendency for one end to rise or fall more than the other end, the result of which would be to cause the paper to assume a conical or cigar-shaped form. To avoid this tendency, a weighted lever V, forked at its lower end, so as to form two arms $V^2$ and $V^3$, is pivoted or fulcrumed to the frame of the machine at $v$, with the lower ends or arms extending beyond the paper a sufficient distance so as to allow the lever to be conveniently placed under it. The weight V' at the outer end of this lever may be adjusted by having the end of the lever screw-threaded and adapted to be screwed onto the end of the lever, the lever being screw-threaded at some distance from its outer end, so as to allow the weight to be placed at any desired point.

T is an arm in the form of a segment of a circle, pivoted to the post U at $t$ and having its lower end forked, so as to embrace the shaft $r$, on which the rollers $R^2$ have their bearing. There are two of these pivoted arms, one on each side of the machine. Both are alike in structure, and they perform the same office. The outer or convex side of the arm T is enlarged at T' and has a slot $t'$ in the form shown in Fig. 4, the edges of which operate as a cam. A bar $T^2$, rigidly secured at each end to the arms $V^2$ and $V^3$ of the lever V, projects into this slot at either end and is adapted to be moved in the slot. This bar $T^2$, working in the cam-shaped slot $t$, regulates the rollers $R^2$ through the arm T, the arm T being forked, so as to embrace the shaft on which said rollers are mounted, as before stated, the shaft $r$ sliding in the boxes $r^2$. If there was not some provision for the automatic receding adjustment of the rollers $R^2$, they would stop the winding of the roll of lining as it increases in diameter. The movement of the bar $T^2$ in the slotted cam causes the lower end of the arm T to move outwardly, moving the shaft $r$ of the rollers $R^2$ in the boxes $r^2$, thus allowing room for the increasing size of the paper roll.

At the farther end of the pressure-plate J and at a point where the finished paper is delivered to the spindle N to be wound thereon I have arranged a series of flat spring-fingers Z, which are pivoted to the pressure-plate J at their lower ends. These fingers are for the purpose of assisting and properly winding the paper on the spindle and press against the paper as it comes around onto the spindle from the point of contact of the paper with the tapes. These fingers are arranged alternately with the tapes and press against the paper in the spaces not occupied by the tapes. For the purpose of pressing the finger Z against the paper roll I have placed in the rear of each finger a wooden roller $z'$, loosely mounted on the shaft R of the tape-rollers $R^2$. The object of the rollers $z'$ is to hold the fingers against the paper roll, and as the roll increases in size the adjustability of the shaft $r$ allows the finger, with the collar pressing against it, to be retracted. For the purpose of keeping the fingers Z in position the coiled spring $z$ is fastened at one end to the upper end of the finger Z and at the other to a convenient place on the frame, as shown in Fig. 4. This spring prevents the finger Z from falling over the spindle N, and also holds the finger in position when it is being pushed back by the increasing size of the roll.

For the purpose of regulating and straightening the edge of the paper before going into the machine and before it is trimmed I have arranged the following devices: 16 is a screw operated by the hand-wheel 17, mounted on the screw at its outer end. At its inner end the screw is secured in the frame of the machine, the lower end of said screw being in the shape of a spindle without any screw-threads on it, with a washer on both ends of the spindle, the outer one of which is fastened onto spindle by a bolt passing through a hole in the end of the spindle. The spindle will turn freely in the frame, so that when the screw is turned in either direction it will not screw into or out of the frame. The screw 16 passes through a lever 20, which is screw-threaded internally at a point where the lever 16 passes through it. This lever 20 passes from the screw 16 to the spindles B B' $B^2$ of the web of paper about to be operated upon, embracing the said rollers with the sides of the lever, which are forked to receive the rollers, as shown in Fig. 14. This lever is adjusted at any point on the spindles by collars 21, resting on said spindles and adjustable at any point by means of set-screws 22. 23 is a stud-pin rigidly secured to the frame at one end, with the other end passing through a hole in the lever 20. This stud-pin is for the purpose of holding the lever 20. 24 are collars for holding the removable web of paper on the rollers and to keep it in position when the paper is unwound from the roller in the machine. Now when the attendant discovers any unevenness in the edges of the paper that is being unwound, so that it cannot be trimmed properly, he turns the screw 16 by the handwheel 17, and this causes the lever 20 to operate the rollers B, with the roll upon it, in such direction as to straighten the edge of the paper, so that it may be properly trimmed.

The machine thus organized operates in the following manner: The machine may of course be organized to operate either upon a single web of paper or upon any desired number of webs simultaneously, and in the present instance I have, as hereinbefore stated, shown a machine which operates upon three webs at the same time. These webs are drawn from the rolls of paper $B^3$ $B^4$ $B^5$ upon the spindles B B' $B^2$, and pass thence through the crimping-rollers C and C'. As hereinbefore stated, these rollers are provided with ribs and grooves or gear-teeth $c$, which are rectangular in cross-section, so that as the upper paper passes between the rollers and is crimped the lines upon which the paper is folded are formed into permanent creases by means of the sharp corners of said ribs. In fact, the ribs or grooves of the two rollers cooperate with each other in such manner as to form dies which not only crimp the paper, but make the crimp permanent by means of this creasing operation due to their sharp edges. It will thus be seen that these rollers act not only as crimping-rollers, but also as creasing or marking rollers. As the paper leaves the crimping-rollers it is prevented from adhering to them, or, in other words, is stripped from them, by means of the stripper-bars D and D' and is fed forward along the bed A' of the machine. For the purpose of feeding the paper along the bed A' after it is stripped from the crimping-rollers I have arranged a series of spiders 30, mounted on a shaft 31. These spiders consist of a wheel with arms extending from the periphery of the hub, the arms and hub being preferably cast in one piece. These arms are L-shaped, with the extension at the top, nearly at right angles to the arm, so shaped as to be adapted to strike the inclined surface of the crimping-paper and push the same forward. These arms are located between the crimping-rollers and tuckers and project up through slots in the table A and are for the purpose, as before stated of feeding the paper forward and preventing the crimping-rollers from clogging. As before stated, the spiders are mounted on shaft 31, which is driven by a sprocket wheel and chain that are connected with another sprocket-wheel attached to and driven by shaft $c^4$ of the lower crimping-roller. During this portion of its course intermediate between the crimping-rollers and the tuckers the paper is not compressed upon the bed A', and is consequently free to expand and contract longitudinally, and also to a certain extent vertically. When it reaches the tuckers, that set thereof (for instance, the tuckers E) which are beginning their forward stroke strike the paper, the finger $e$ striking the rear inclined surface of the crimped paper and tucking the inclined sides thereof under the top. The shape of the tucking-fingers $e$ and $e'$ obliges the rear inclined side to slide under the top to form one-half of the plait, (the upper fingers $e'$ preventing the paper from rising under the action of the fingers $e$,) and the forward motion imparted to the whole crimp by the tuckers causes the forward inclined side of the crimp to slide under the top, and the forward edge of the plait comes in contact with the inclines $d^4$ of the stripper-bars D', when the plait is tilted downward completely formed and caused by the movement of the tuckers to pass under the compressor G. During this forward movement of the tuckers E the tuckers E' have been lifted up by the mechanism provided for this purpose and carried rearward into a position to begin a new stroke. As the tuckers E begin to recede after the completion of their forward stroke the tuckers E' begin to advance to form another plait and to feed the same under the compressor, and this forward movement of the tuckers E' holds the plaits already formed in position under the compressor, the stripper-bars D' aiding them in effecting this result. When the tuckers E have been withdrawn a slight distance, so as to clear them from under the compressor, the said compressor descends and strikes the plaited paper which is under it a forcible blow, which compresses the same and renders its plaited form permanent. The compressor is then lifted and the tuckers E', which have been advancing during this operation, complete their forward stroke and begin to recede, when the operation begins as before at this point. After leaving the compressor the plaited paper is then allowed to rise, being permitted to accomplish this by means of the inclines $d^5$, so that when the paper in its onward movement reaches the pasting mechanism it is again free to expand and contract longitudinally, and also vertically to a slight extent. It will be observed that the paper is allowed to expand and contract longitudinally on each side of the tucking and compressing mechanism, and by this means provision is made for passing from the continuous movement imparted by the crimping-rollers C and C' to the step-by-step motion which characterizes the tuckers and compressors and also of the passing from this step-by-step motion to the continuous motion which the paper has imparted to it by the belts I during its passage through the pasting mechanism. It will be observed that the pressure-plate above the pasting mechanism is inclined downward from front to rear, so that the paper is gradually compressed as it passes under the said pressure-plate, under which it is carried away by means of the belts I. During its advance under the said pressure-plate the paper passes over the paste-wheels H and receives upon its under side a supply of paste from each paste-wheel which extends, of course, in a continuous line having a width equal to the paste-wheel. These paste-wheels correspond in number with the rollers L, which carry the rolls L' of binding-strips. Each binding-strip after passing through its tension mechanism is laid upon and held against the correspondingly-pasted surface of the plaited paper with which it is rolled, and thereby caused to adhere to the same, thus completing the fabric, which consists of one or more crimped and plaited layers secured by the binding-strips L'. The finished fabric is then wound upon the roller N. It will be seen that the roller N is driven from its periphery, or, more strictly speaking, from the periphery of the roll which is formed thereon by the finished fabric, so that no matter how small or how large the roll thereon may be the circumferential speed of the roll will always be the same and will exactly correspond to the rate at which the finished fabric is fed from the machine. When the roll on the roller N has reached such a size as to render it desirable or necessary to remove the same from the machine, the catches $s^2$ are raised, the triangle is swung up, and the said roller, along with the roll of the fabric thereof, is rolled out upon the table which is provided at the rear end of the machine to receive the same. The roller N may be then removed from the roll and be placed in the position shown in the drawings, or another roller similar in construction may be substituted therefor and the operation proceeds as before.

In the preceding description the various connecting and adjusting mechanisms have not been referred to in detail, as their construction has been hereinbefore fully explained and their operation will be readily understood. It will be seen that the entire machine is automatic in its operation and will produce the completed fabric in a rapid, cheap, and efficient manner, requiring as it does only the amount of attention necessary to replenish the stock of raw material and remove the finished fabric.

It is obvious that various modifications may be made in the details of construction and arrangement of the parts without departing from the principle of my invention, and I therefore do not wish to be understood as limiting myself strictly to the precise details hereinbefore described, and shown in the drawings.

Having thus described my invention, what I claim as new, and desire to secure by Letters Patent, is—

1. In a machine for making box-plaited paper, the crimping-rollers for crimping the paper, in combination with the tuckers for forming the crimped paper into box-plaits, substantially as and for the purposes specified.

2. In a machine for making box-plaited paper, the combination, with the crimping-rollers, of the tuckers for forming the box-plaits and a compressor for compressing the plaits and rendering their folds permanent, substantially as and for the purposes specified.

3. In a machine for making box-plaited paper, the combination, with the crimping-rollers, of the tuckers, the compressor, a pasting mechanism for supplying paste to the plaited paper, and means for applying binding-strips to the pasted portions thereof, substantially as and for the purposes specified.

4. In a machine for making box-plaited paper, the crimping or die rollers C C', having intermeshing die grooves and ribs rectangular in cross-section, in combination with a tucking mechanism adapted to operate upon the base of the upright sides of the crimps made by said dies to form the same into a box-plait, substantially as described.

5. In a machine for making box-plaited paper, the crimping-rollers C C', provided with intermeshing grooves or ribs $c$, rectangular in cross-section and having circumferential grooves $d$, in combination with the stripper-bars D D', arranged in said grooves, substantially as shown and described.

6. In a machine for making box-plaited paper, the tuckers arranged in two series, reciprocating in opposite directions, and engaging with the paper during their forward movement only, substantially as and for the purposes specified.

7. In a machine for making box-plaited paper, the tuckers E, each provided with an inclined finger $e$ and a horizontal finger $e'$, substantially as and for the purposes specified.

8. In a machine for making box-plaited paper, the transverse rock-shafts, each provided with a series of tucker-arms and having their boxes mounted to slide in suitable ways, in combination with the operating-shafts provided with eccentrics of equal but opposite eccentricity and pitmen connecting said eccentrics to their respective rock-shafts, substantially as and for the purposes specified.

9. The combination of the rock-shafts which carry the tuckers and the arms attached to said shafts for rocking said shafts with cams arranged to strike said arms alternately, thereby rocking the shaft of the tucker-arms and causing the tuckers to rise clear of the paper while being retracted, substantially as shown and described.

10. In a machine for making box-plaited paper, the combination of the cams with the arms having rollers at one end and the rock-shafts to which said arms are attached for the purpose of vibrating the same, the tuckers, and a flat spring curved upward at its free end and so arranged that said arms will ride upward on said spring when the tuckers are being retracted and said spring will press the tuckers onto the paper during their forward movement, substantially as shown and described.

11. The combination, with the compressor G, having arms $G^2$, with rollers $g^3$, of the cam-wheels $G^3$, provided with depressions $g^4$, and the springs G', bearing upon the top of the compressor, substantially as and for the purposes specified.

12. In a machine for making box-plaited paper, the combination, with the compressor, of the series of tucker-arms reciprocating simultaneously in opposite directions and engaging with the paper during their forward movement, substantially as and for the purposes specified.

13. In a machine for making box-plaited paper, the combination, with the bed of the machine, along which the paper travels, of crimping-rollers arranged at the front end of the bed, the tuckers and compressor arranged in the rear of the crimping-rollers, a pasting mechanism arranged in the rear of the tuckers and compressor, and the stripper-bars extending above the bed through the crimping-rollers and through the tuckers and compressor to the pasting mechanism, substantially as and for the purposes specified.

14. In a machine for making box-plaited paper, the combination, with the bed, of the continuously-operating crimping-rollers and pasting mechanism arranged at the ends thereof, the intermittently-operating tuckers and compressor intermediate between them, and the stripper-bars extending above the bed through the crimping-rollers to the pasting mechanism and constructed and arranged to allow the paper free play to expand and contract at each end and to compress the same upon the bed during the tucking and compressing operations, substantially as and for the purposes specified.

15. The combination, with the tuckers and the compressor, of the upper stripper-bars extending above the bed through the tuckers and compressor and provided with inclines $d^4$ between the tuckers and compressor, substantially as and for the purposes specified.

16. The combination, with the bed A', of the upper stripper-bars D', pivoted at their forward ends, and the spring-supported and adjustable cross-bars $D^2$, to which said stripper-bars are connected at their rear ends, substantially as and for the purposes specified.

17. The combination, with the bed A', of the belts I, traveling thereon, the paste-wheels H, arranged between the belts, and the elastic pressure-plate J, arranged above the belts, substantially as and for the purposes specified.

18. The combination, with the bed A', of the belts I, traveling thereon, the paste-wheels H, arranged between the belts, and the inclined and adjustable pressure-plate J, substantially as and for the purposes specified.

19. The combination, with the feeding-belts, of the paste-wheels intermediate between the same, the pressure-plate for holding the paper upon the paste-wheels, and independent rollers corresponding in number to the paste-wheels and arranged to supply the binding-strips to the fabric, substantially as and for the purposes specified.

20. The combination, with the independent rollers L and the binding-strips L', carried thereby, of tension devices for regulating the feed of the binding-strips, substantially as and for the purposes set forth.

21. In a machine for making box-plaited paper, the feeding mechanisms consisting of a serrated plate secured to an arm, a feed-bar on which said arm is mounted, a lever having suitable devices whereby said lever reciprocates said feed-bar horizontally, and a box in which said bar moves horizontally and which is reciprocated vertically by a cam operated by suitable devices, in combination with the compressor and pasting mechanisms, said feeding mechanisms being so arranged in the machine as to assist in moving the paper from the compressor to be acted on by the pasting mechanisms, substantially as shown and described.

22. In a machine for making box-plaited paper, a spindle N, upon which the finished product is to be wound, having its journals freely movable vertically, in combination with an adjustably-weighted lever applied to said spindle to keep it horizontal, conveying-tapes passing around said spindle and arranged to receive the finished product from the bed of the machine and conduct it to and wind it upon the said spindle, a series of driving-rollers upon which said tapes are mounted, one or more of which rollers are provided with adjustable bearings, adjustable weights or counter-balances applied to said movable roll or rolls and arranged to adjust the same automatically to keep the tapes taut as the spindle is filled, and mechanism for driving said rollers to impart the required movement to the tapes, substantially as described.

23. In a machine for making box-plaited paper, a spindle arranged to receive the finished paper from the machine, in combination with endless tapes so arranged as to guide said paper onto the spindle, rollers upon which said tapes are mounted, and sprocket chains and wheels which actuate said rollers, and a triangle pivoted to the frame and in which part of the rollers have their bearing, said triangle being so pivoted and held as to be capable of being thrown up when the roll of paper is completed, substantially as and for the purposes specified.

24. In a machine for making box-plaited paper, a frame containing rollers suitably arranged for carrying the endless tapes in such manner as to guide the finished paper onto the spindle, said frame having a section containing part of the rollers so pivoted as to allow said section to be swung up, so as to remove the finished roll of paper, in combination with weights suitably arranged to hold said tapes tightly secured upon said rollers and to hold said triangle when it is swung up, substantially as and for the purposes specified.

25. In a machine for making box plaited paper, the weighted lever V, pivoted to the frame of the machine and having at its lower end the forks V² and V³, with the bar T² rigidly secured at the outer ends of the forks V² and V³, in combination with the arm T, having the slot $t'$, in which the bar T² moves upwardly as the roll increases in size, and the spindle N, substantially as shown and described.

26. In a machine for making box-plaited paper, the weighted lever V, fulcrumed to the frame of the machine, and the adjustable weight V', and the bar T², rigidly secured to the forks V² and V³ of the lever, and the arm T, having the slot $t$, in which the bar T² moves, in combination with the adjustable shaft $r$, rollers R², and spindle N, substantially as shown and described.

27. In a machine for making box-plaited paper the fingers Z and the tapes P, in combination with the spindle N, substantially as and for the purposes specified.

28. In a machine for making box-plaited paper, the screw 16, secured to the frame of the machine, and the stud-pin 23 and lever 20, in combination with the spindles B B' B², all combined and arranged substantially as and for the purposes specified.

AUSTIN GIBB.

Witnesses:
   ALOYSIA HELMICH,
   H. H. TALCOTT.